United States Patent [19]

Hilton et al.

[11] Patent Number: 4,716,196

[45] Date of Patent: Dec. 29, 1987

[54] FLAME RETARDED THERMOPLASTIC STYRENIC COMPOSITIONS

[75] Inventors: Glenn B. Hilton, Enfield, Conn.; Wayne W. Robertson, Springfield, Mass.

[73] Assignee: Monsanto Company, St. Louis, Mo.

[21] Appl. No.: 656,195

[22] Filed: Oct. 1, 1984

[51] Int. Cl.$^4$ .................. C08L 51/04; C08L 71/04
[52] U.S. Cl. ..................................... 525/72; 524/373; 525/68; 525/905
[58] Field of Search .................. 524/373; 525/905, 72, 525/68

[56] References Cited

U.S. PATENT DOCUMENTS

| | | |
|---|---|---|
| 4,032,508 | 6/1977 | Anderson ............................ 524/373 |
| 4,107,232 | 8/1978 | Haaf et al. ...................... 260/876 R |
| 4,332,714 | 6/1982 | Haaf et al. .............................. 525/92 |
| 4,391,935 | 7/1983 | Bialous et al. ........................ 524/82 |

Primary Examiner—Jacob Ziegler
Attorney, Agent, or Firm—Michael J. Murphy; William J. Farrington

[57] ABSTRACT

Polytetrafluoroethylene resin within a specific particle size range, preferably about 70 to about 700 microns, in polymeric thermoplastic styrenic compositions containing conventional flame retardant additives permits reducing the amount of such additives in the composition to levels low enough to avoid adverse effect on performance properties of such compositions which would otherwise occur at higher levels of such additives necessary to achieve UL-94 flame retardant performance.

2 Claims, No Drawings

FLAME RETARDED THERMOPLASTIC STYRENIC COMPOSITIONS

BACKGROUND OF THE INVENTION

This invention relates to flame retarded thermoplastic compositions and more particularly to flame retarded styrenic compositions.

As disclosed in many U.S. patents, of which U.S. Pat. No. 4,107,232 is representative, it is known to use polytetrafluoroethylene (PTFE) resin as an anti-drip agent in polymeric compositions containing flame retardant additives. It is also generally known that the performance properties of such compositions can be adversely affected at additive levels therein required to achieve a satisfactory degree of flame retardant performance as measured by published standards such as The Underwriters Laboratory flammability test, designated UL 94. For example, the levels of flame retardants in a polymeric ABS composition (a copolymer of styrene and acrylonitrile grafted on a rubber substrate which is dispersed in an ungrafted matrix copolymer of styrene and acrylonitrile) necessary to achieve a UL 94 rating of V-0 (as hereinafter defined) can result in bloom and/or plateout problems when the composition is molded into parts. As used herein, "bloom" means the undesirable appearance of a white layer of material on the surface of a flame retarded molded part after a period of time as short as a few minutes. The layer is principally composed of flame retardant additive(s) which have migrated to the surface of the part. The term "plateout" as used herein, means the deposition and buildup of material on the surface of a mold being used to shape parts made from such composition, which material is transferred to the parts causing surface appearance defects, and which can plug mold vents to cause molding problems from trapped gases; the built up material is principally composed of the flame retardant additive(s) used in the specific molding composition. Moreover, such high levels of flame retardant additives can result in a deterioration of the strength properties of the composition in comparison with those of the unmodified material.

SUMMARY OF THE INVENTION

Now, however, improvements have been made in flame retarded compositions which minimize the aforementioned shortcomings of the prior art.

Accordingly, it is a principle object of this invention to provide a flame retarded thermoplastic styrenic composition having a desirable balance of performance properties at optimum cost.

Another object is to provide a flame retarded styrenic composition wherein the problems of bloom and plateout are significantly reduced.

A specific object of this invention is to provide such a composition wherein the main polymeric component is ABS.

Other objects of this invention will in part be obvious and will in part appear from the following description and claims.

In accordance with this invention, it has been found that the use in the polymeric styrenic composition being flame retarded of a small amount of polytetrafluoroethylene (PTFE) resin having a particle size within a specific range permits a reduction in the use of other conventional flame retardant additives to produce the same level of flame retardant performance (as measured by the UL 94 test) as would be achieved without the PTFE but at higher levels of such other conventional additives. The reduced loading of flame retardant additives made possible by such use of PTFE at the appropriate concentration as a flame retardant enhancer in the formulation significantly reduces bloom and plateout without adversely affecting the strength properties of the composition.

More specifically, a flame retarded thermoplastic composition is provided comprising in intimate admixture: (a) a normally flammable, thermoplastic, polymeric material containing polymerized styrene, preferably ABS; (b) a flame retardant additive composition in an amount sufficient to impart flame retardant properties to such material; and (c) polytetrafluoroethylene resin having a particle size between about 70 to about 700 microns in an amount sufficient to reduce the amount of said flame retardant additive required to produce said flame retardant properties from that amount of such flame retardant additive required to achieve said properties in the absence of polytetrafluoroethylene resin.

DESCRIPTION OF PREFERRED EMBODIMENTS

The polytetrafluoroethylene (PTFE) resin flame retardant enhancer of this invention functions to permit a reduction in the level of other flame retardant additives in the thermoplastic styrenic composition, which per se are necessary to meet the Underwriter's Laboratory UL 94 Test below those levels required in the absence of such PTFE. With such a reduction in such other additives, plateout and particularly bloom are reduced. This is unexpected in view of the different prior art disclosure of PTFE as an anti-drip agent.

The amount of PTFE in the formulation of the invention effective to achieve the foregoing function will vary depending on the nature of the styrenic thermoplastic polymer in which it is dispersed. On the one hand, such level should be sufficient to achieve the result intended while on the other hand it should not be so high as to undesirably adversely affect the strength properties of the flame retarded styrenic composition. For example, in the preferred ABS composition the level of PTFE should not cause the multiaxial impact strength (as further defined hereinafter) to drop below 15 ft lb (20.3 J). Generally the amount should be between about 0.05 to about 0.20 weight percent (based on the combined weight of the thermoplastic styrenic composition, the flame retardant additive or mixture of additives and the PTFE) and preferably 0.08 to 0.10 percent for ABS compositions.

To function according to the invention, the PTFE component of the formulation must be in particulate form (although it could be agglomerated) after melt mixing and molding of the styrenic formulation in which it is dispersed. Moreover, such PTFE component must be within a particular particle size range which, it is believed, is related to the physical manner in which it functions in the system. More specifically, PTFE useable in this invention is a fibrous material tending to shrink or contract in size when heated. When this occurs with the PTFE dispersed in a thermoplastic styrenic polymer specimen exposed to heat in a UL 94 vertical burning test, it is postulated that the thicker specimen produced by the shrinking or contracting PTFE presents a lower surface/volume ratio to the flame which is therefore capable of absorbing more heat and accordingly more difficult to ignite or less likely to continue burning after igniting. In this regard, the particle size of the PTFE should be at least 20 microns, is preferably between about 70 to 700 microns and most preferably 350 to 650 microns. As long as the foregoing requirements of particle size and form after melt mixing are satisfied, any form of PTFE can be used in this invention. Suitable operable PTFE's are commercially available from E. I. DuPont de Nemours and Company of Wilmington, Del. Such PTFE may be either a homopolymer or a copolymer of PTFE with another copolymerizable monomer wherein the PTFE is present as the major polymeric constituent in the copolymer, preferably at least at a level of 80 weight percent.

The present invention is applicable to any inherently flammable thermoplastic composition containing polymerized styrene. Representative of such compositions are: polyphenylene oxide and other polymer blends with styrenic polymers; styrene-acrylonitrile copolymers; acrylonitrile/butadiene/styrene (ABS) graft polymers; polystyrene homopolymer and polystyrene homopolymer modified with rubber. The preferred styrenic compositions in which the PTFE of this invention is operable are ABS graft polymers. Such ABS graft polymers are prepared from rubbers, such as diene rubbers, ethylene/propylene rubbers, ethylene/propylene/non-conjugated diene rubbers, acrylate rubbers, polyisoprene rubbers and mixtures thereof, monovinyl aromatic hydrocarbon and ethylenically unsaturated nitrile monomers. The rubber comprises from about 60 to about 10 percent by weight of the total ABS composition and the ethylenically unsaturated nitrile and monovinyl aromatic hydrocarbon comprise from about 40 to about 90% of the total ABS composition. The term monovinyl aromatic hydrocarbon is meant to include compounds such as styrene, alpha-methylstyrene, vinyl toluene, vinyl xylene, ethylvinylbenzene, isopropyl styrene, chlorostyrene, dichlorostyrene, ethylchlorostyrene, mixtures thereof and the like. The ethylenically unsaturated nitrile compounds include compounds such as acrylonitrile, methacrylonitrile, ethacrylonitrile, chloroacrylonitrile, mixtures thereof, and the like.

The foregoing class of inherently flammable thermoplastic compositions containing polymerized styrene and methods for forming same are more particularly described in the following patents, the noted passages of which are incorporated herein by reference: blends of polyphenylene oxide and styrenic resins, polystyrene and rubber-modified polystyrene-U.S. Pat. No. 4,355,126-col. 2, line 5 through col. 3, line 50; acrylonitrile-butadiene-styrene resins-U.S. Pat. No. 4,355,126-col. 3, lines 51 through 66; styrene-acrylonitrile copolymers-U.S. Pat. No. 3,993,621, col. 2, lines 28-42.

The nature of the non-PTFE flame retardant component(s) of the formulation of the invention is not critical. A single compound or a mixture of two or more individual flame retardant compounds may be used. Typical flame retardant components useful in the present invention are disclosed in U.S. Pat. No. 4,355,126, col. 4, line 14 through col. 6, line 29, the content of which is incorporated herein by reference. The preferred non-PTFE flame retardant additive is a mixture of an organic halide such as hexabromodiphenoxyethane, chlorinated polyethylene and a metal oxide such as antimony trioxide.

The preferred composition of the invention comprises 0.05 to 0.2 parts by weight PTFE per 100 parts by weight of a mixture of ABS and flame retardant additive(s) wherein the mixture contains 70 to 80 parts by weight ABS and 20 to 30 parts by weight of such flame retardant additive(s).

In addition to flame retardant constituents, the compositions of this invention may contain other additives such as dyes, pigments, ultraviolet light and/or heat stabilizers, fibrous or metal reinforcing agents, fillers, lubricants, plasticizers and the like.

Exemplary of the present invention are the following specific examples wherein all parts are parts by weight unless otherwise indicated.

The following tests were conducted on specimens prepared according to such specific examples or were used to measure properties of components of the formulations used in such examples.

1. Particle Size - ASTM D1457.

2. Multiaxial Impact Strength-Driven Dart Impact Test-A multiaxial test defining the energy required to fracture a stationary specimen by a mechanically driven dart moving at a speed of 6250 inches/min (15,875 cm/min). Injection molded chips (3"×4"×0.100") (76×101.6×2.5 mm) preconditioned to a temperature of 73° F. (22.8° C.) and a dart with a 1.5" (3.8 cm) diameter hemispherical nose were used. The dart was instrumented to detect the loading force generated as it impacted and moved through the specimen. The dart position was detected by a light emitting diode coupled to a time base generator. These signals were transmitted to a storage oscilloscope such that a force-displacement trace was generated for each specimen. The area under this trace from contact to specimen failure determined the absorbed energy measured in ft.lb. or joules.

3. Underwriters' Laboratory flammability test designated UL 94 is described in "Standard For Tests For Flammability Of Plastic Materials For Parts In Devices and Appliances", third edition, Jan. 28, 1980. Briefly, in this UL 94 vertical burn test, the test specimen measuring 5"×0.5"×0.0625" (127×12.7×1.59 mm) is suspended vertically at a measured height above a flame from a Bunsen burner. After 10 seconds the flame is removed and the duration of the flaming of the test specimen is noted. Immediately the flame is placed again under the specimen and after 10 seconds the flame is again withdrawn and the duration of flaming and glowing is noted. Five test specimens are thus tested and the results of all five tests are considered in the determination of a rating for the plastic material.

The following are noted: (1) duration of flaming after first flame application; (2) duration of flaming after second flame application; (3) duration of flaming plus glowing after second flame application; (4) whether or not the specimens burn up to their point of suspension; and (5) whether or not specimens drip flaming particles which ignite a cotton swatch placed 12 inches beneath the test specimen.

The highest rating given to a material is "V-0" which indicates that (1) no specimen burns with flaming combustion for more than 10 seconds after each application of the test flame, (2) the material does not have a total flaming combustion time exceeding 50 seconds for the 10 flame applications for each set of 5 specimens; (3) no specimen burns with flaming or glowing combustion up to the holding clamp; (4) no specimen drips flaming particles that ignite the dry cotton beneath the specimen; and (5) no specimen glows for more than 30 seconds after the second removal of the flame.

The next highest rating is "V-1" which indicates that (1) no specimen burns with flaming combustion for more than 30 seconds after each application of the test flame; (2) the material does not have a flaming combustion time exceeding 250 seconds for the 10 flame applications for each set of 5 specimens; (3) no specimen burns with flaming or glowing combustion up to the holding clamp; (4) no specimen drips flaming particles that ignite the dry surgical cotton beneath the specimen; and (5) no specimen glows for more than 60 seconds after the second removal of the flame.

A "V-2" rating is given to a composition (1) when no specimen burns with flaming combustion for more than 30 seconds after each application of the test flame; (2) it does not have a total flaming combustion time exceeding 250 seconds for the 10 flame applications for each set of 5 specimens; (3) no specimen burns with flaming or glowing combustion up to the holding clamp; (4) some specimens drip flaming particles which burn only briefly, some of which ignite the dry cotton beneath the specimen, and (5) no specimen glows for more than 60 seconds after the second removal of the flame.

4. Bloom. The tendency of a composition to bloom was simulated by measuring the gloss level of injection molded chips using a Mallinckrodt Reflectometer with a sixty degree light source both before and after conditioning in an 85° C., air circulating oven for 24 hours. It was hypothesized that as bloom formed, which is accelerated by the effect of heat versus time, the resultant surface film would diminish gloss, with low gloss numbers indicative of greater bloom and vice versa. The reduction in gloss level after versus before conditioning was considered to be a measurement of bloom. Provisions were made for separating the effect contributed by the thermal process from that of the bloom alone.

The products to be evaluated for bloom were injection molded into 3"×4"×0.100" (76×101.6×2.5 mm) chips using a highly polished mold and molding conditions contributing to high gloss. The mold was heated with 150° F. (115.6 ° C.) circulating water and the plastic was injected at high speed while at a nominal stock temperature of about 450° F. (232 ° C.). With a 2 oz. (57 gm) screw injection machine, a typical processing cycle time was 30 sec. (for complete injection, cooling and part removal). After molding, and prior to oven exposure, a sample chip was first wiped with a soft tissue to remove any dust and/or migrated material which causes bloom. It was then immediately inserted into a sample clamp holder of a fully equilibrated and previously calibrated Model 4060 Mallinckrodt Reflectometer such that the 3" (7.6 cm) width is parallel to the reflectometer light beam, and centered within the reflection aperature. This model reflectometer was programmed to read reflected gloss units at an observer angle of 60°. The sample chip was then inserted in a wooden block which had been slotted in such a manner that it maintained the chip in an upright position. The block and specimen were then placed in the air circulating oven at an average air temperature of 85° C. and positioned such that the air flow was parallel to the two flat major faces of the chip. After 24 hours exposure, the sample and holder were removed and permitted to cool to ambient conditions over 30 minutes. The chip was then removed from its holder and without wiping, the previously measured surface was remounted in the Reflectometer to remeasure the 60° gloss of the same surface area as was measured prior to oven exposure. Its gloss value was noted with the difference between the original and oven-aged-unwiped gloss representing a change induced by the combination of both thermal effects (which may sufficiently alter the surface to change gloss) and bloom of any migrating ingredient within the product formulation. The sample was then removed from the Reflectometer, the surface being measured was wiped, and the specimen then returned to the Reflectometer for final gloss measurement. The difference between the wiped vs. unwiped specimen gloss after oven aging represented a change induced by the presence of bloom, whereas the gloss difference between the wiped specimen before and after oven exposure represented a solely thermally induced change.

EXAMPLE 1

This is a comparative Example illustrating a flame retarded ABS composition without PTFE which achieved a V-0 rating in the UL-94 vertical burn test, (i.e. exhibited flame retardant properties) but which had unacceptable bloom.

The ingredients of the flame-retarded composition were mixed in a Banbury mixer for about 2-½ minutes at 200° C. and 100 rpm. and then pelletized. Test bars (½" by 5" by 1/16" thick) (12.7 by 127 by 1.59 mm) were then injection molded therefrom at 230° C. stock temperature. The UL-94 test as previously described was then conducted on ten such test bars; no dripping from any of the bars was noted.

In the test for bloom, the injection molded chips were aged at 85° C. for 24 hours and the reduction in sixty degree gloss of the chips after removal from the oven versus the gloss before oven aging was measured. Lowering of the gloss as a measure of bloom greater than 40 units was considered to represent excess bloom and unacceptable.

The results obtained are set forth in the following Tables 1 and 2.

TABLE 1

| Formulation % of Component | Flame Application | Bar No. | Burn Time (sec.) | | | | | | | | | |
|---|---|---|---|---|---|---|---|---|---|---|---|---|
| | | | 1 | 2 | 3 | 4 | 5 | 6 | 7 | 8 | 9 | 10 |
| 65.35 ABS[1] | | | | | | | | | | | | |
| 20.89 FF 680[2] | first | | 0.9 | 1.1 | 0.9 | 0.9 | 0.8 | 0.9 | 0.9 | 0.8 | 0.9 | 0.8 |
| 5.61 CPE 3615[3] | | | | | | | | | | | | |
| 8.15 Sb$_2$O$_3$[4] | second | | 2.2 | 1.8 | 3.2 | 1.3 | 1.2 | 2.3 | 3.2 | 24.1 | 5.5 | 5.0 |

[1]A blend of: styrene/acrylonitrile copolymer containing 70/30 weight % styrene/acrylontrile in which is dispersed a polybutadiene rubber grafted with 70/30 S/AN, the polybutadiene being present at about 12% in the blend.
[2]hexabromodiphenoxyethane containing 70% elemental bromine from Great Lakes Chemical Company.
[3]chlorinated polyethylene containing 36% elemental chlorine from Dow Chemical Company.
[4]from Laurel Industries of Forked River, N.J.

TABLE 2

| Before Aging (wiped) | After Aging (wiped) | After Aging (not wiped) | Reduction-Thermal Change only | Reduction Due to Bloom |
|---|---|---|---|---|
| 87.3 | 82.4 | 20.2 | 4.9 | 62.2 |

The above data of Table 1 illustrate (bar nos. 1–5) a flame retarded ABS composition entitled to a UL-94 V-0 rating but which exhibited significant bloom attributed to migration of the flame retardant components to the surface of the molded specimens as evidenced by the 62.2 unit loss in gloss during the bloom test.

EXAMPLES 2–6

These Examples illustrate the reduction in bloom (versus Example 1) that occurs according to the invention when a low amount of PTFE is included in the composition, without incurring a loss in UL-94 V-0 rating.

For simplification, the burn times of the test specimens are not listed in Table 3; the UL-94 rating shown is based on the definition in the test procedure summarized above and actual burn times (5 bars, two flame applications) short enough to permit the noted rating to be given.

At levels of PTFE much above about 0.15% in the ABS formulation, though bloom will be minimal and a UL-94 rating achievable, the multiaxial impact strength of the formulation will have excessively deteriorated.

TABLE 3

| Example | Formulation % of component | UL-94 Rating | Gloss Reduction From Bloom (60 degree units) | Multiaxial Impact Strength (ft. lb.) | Multiaxial Impact Strength J |
|---|---|---|---|---|---|
| 2 (control) | 71.99 ABS<br>20.88 FF680<br>5.09 $Sb_2O_3$<br>2.04 CPE<br>0.0 PTFE[1] | No rating-sample burned to clamp during second flame application | — | 125 | 169.5 |
| 3 | As for Example 1 with 0.05% PTFE[1] and 71.94% ABS | No rating-sample burned to clamp during second flame application | — | 120 | 162.7 |
| 4 | As for Example 1 with 0.08% PTFE and 71.91% ABS | V-O | 34.3 | 110 | 149 |
| 5 | As for Example 1 with 0.10 PTFE and 71.89% ABS | V-O | — | 85 | 115.3 |
| 6 | As for Example 1 with 0.20 PTFE and 71.79% ABS | V-O | — | 10 | 13.56 |

[1]Teflon 6C from E. I. duPont de Nemours & Co.; particle size of 500 ± 150 microns by ASTM D1457.

It is postulated that the values of gloss reduction from bloom for the control and Examples 3, 5 and 6 would be the same as Example 4 since the presence of teflon in the small amounts used has by itself no direct affect on bloom.

The above data of Table 3 illustrate flame retarded (V-0 rating) ABS formulations exhibiting low bloom (i.e. decreased gloss reduction) and decreasing multiaxial impact strength with increasing PTFE content, until at a PTFE level much in excess of about 0.15% the multiaxial impact strength has undesirably diminished to an excessively low level (Example 6). The low bloom of the composition of invention Example 4 which achieves a V-0 rating in comparison with Example 1 is attributable to the reduced levels of non-PTFE flame retardant constituents made possible by the presence of the PTFE (5.09 versus 8.15% $Sb_2O_3$; 2.04 versus 5.61% CPE). It is postulated that plateout would be correspondingly low.

EXAMPLES 7–10

These Examples illustrate the effect of PTFE particle size in the invention.

The procedure of Example 1 was repeated at varying concentrations of PTFE in the compositions. The PTFE of Examples 7–9 from E. I. DuPont de Nemours and Co. was Teflon DLX6000 having a particle size of less than 1 micron. The PTFE of Example 10 was the same as used in Examples 3–6-i.e. 500±150 microns. The results obtained with the UL-94 test are set forth in the following Table 4.

TABLE 4

| Example | Formulation (% Component) | PTFE (%) | UL Rating |
|---|---|---|---|
| 7 | 73.50 ABS<br>20.89 FF680<br>0 CPE<br>5.10 $Sb_2O_3$ | 0.51 | No Rating-samples burned entirely on second flame application |
| 8 | As for Example 7 but with 71.97 ABS | 2.04 | No-as for Example 7 |
| 9 | As for Example 7 but with 68.91 ABS | 5.10 | No-as for Example 7 |
| 10 | As for Example 7 but with 73.50 ABS | 0.51[1] | V-O |

[1]Multiaxial impact strength estimated to be less than 15 ft. lb. (20.3J)

The above data of Table 4 illustrate that PTFE having a particle size of one micron or less has no effect as a flame retardant enhancer, even at loadings over 60 times higher than those showing an effect with the larger particle size (Example 4 at 0.08% PTFE versus Example 9 at about 5% PTFE).

The preceding description is set forth for purposes of illustration only and is not to be taken in a limited sense. Various modifications and alterations will be readily suggested to persons skilled in the art. It is intended, therefor, that the foregoing be considered as exemplary only and that the scope of the invention be ascertained from the following claims.

We claim:

1. A flame retarded thermoplastic composition consisting essentially of, in intimate admixture:
   (a) a copolymer of styrene and acrylonitrile grafted on a rubber substrate which is dispersed in a matrix copolymer of styrene and acrylonitrile;
   (b) a flame retardant additive or mixture of such additives in an amount sufficient to impart flame retardant properties to said grafted and ungrafted copolymers; and
   (c) polytetrafluoroethylene resin having a particle size within the range of about 70 to about 700 microns in an amount of between 0.05 and 0.15 weight percent based on the weight of (a), (b) and (c).

2. The process for reducing the level of flame retardant additive required in a flame retarded composition consisting essentially of a copolymer of styrene and acrylonitrile grafted on a rubber substrate which is dispersed in a matrix copolymer of styrene and acrylonitrile, to achieve a passing rating in the UL-94 vertical position burning test which comprises incorporating into said composition from 0.05 to 0.20 parts of polytetrafluoroethylene resin per hundred parts of said copolymer graft, ungrafted matrix and flame retardant additive, said resin having a particle size of from about 350 to 650 microns.

* * * * *